O. A. KENYON.
ELECTRIC WELDING.
APPLICATION FILED JUNE 28, 1916.
1,218,269.
Patented Mar. 6, 1917.
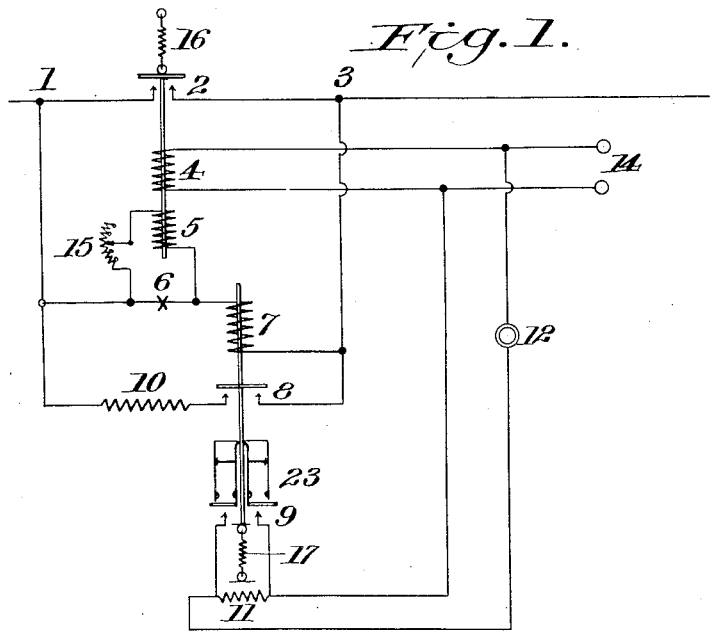
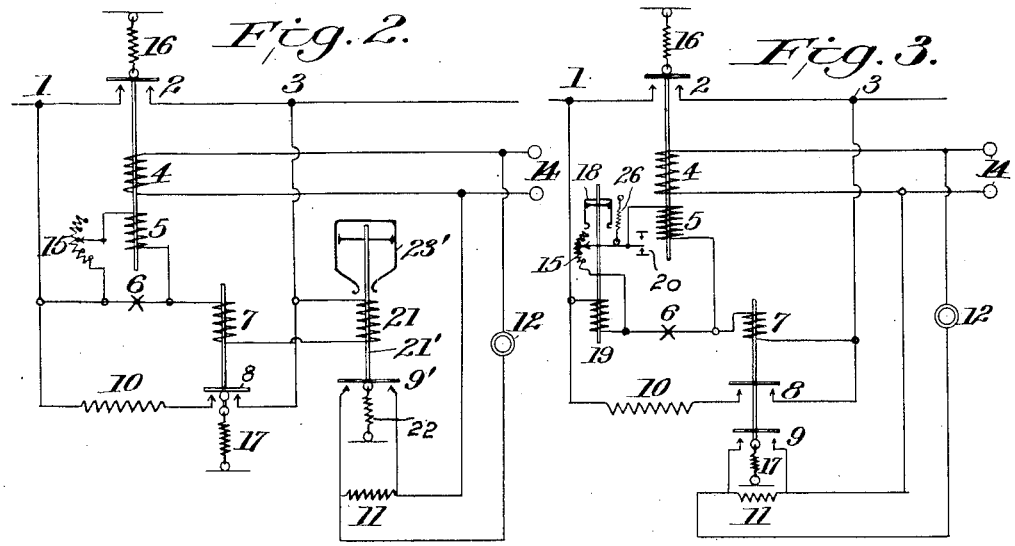
Inventor
Otis Allen Kenyon
By T. Walter Fowler
Attorney

UNITED STATES PATENT OFFICE.

OTIS ALLEN KENYON, OF NEW YORK, N. Y.

ELECTRIC WELDING.

1,218,269.   Specification of Letters Patent.   Patented Mar. 6, 1917.

Application filed June 28, 1916. Serial No. 106,426.

*To all whom it may concern:*

Be it known that I, OTIS ALLEN KENYON, a citizen of the United States, residing at New York city, in the county of New York and State of New York, have invented certain new and useful Improvements in Electric Welding, of which the following is a specification.

My invention relates to the art of electric welding and it consists of the parts and the arrangements and combinations of parts substantially as I will hereinafter describe and claim.

In the accompanying drawings forming part of this specification I show for purposes of illustration several systems which are capable of carrying out my invention, but it will be understood that said invention is intended to include other and different arrangements and in fact any arrangement of parts capable of producing like results and coming within the scope of the hereinafter recited claims.

Figure 1 illustrates more or less diagrammatically a circuit for a system capable of carrying out my invention.

Figs. 2 and 3 illustrate similar systems of somewhat modified arrangement and which I will hereinafter describe.

In order that the present invention may be fully understood, and the value of the same appreciated, I will state that although electric arc welding is one of the oldest practical applications of electricity, it has apparently not come into the general use it might have, had it been better understood, and the welding current better controlled.

Heretofore, two general systems of electric distribution have been employed in electric arc welding; namely the constant-potential system and the constant-current system. The first named system, namely, the constant-potential system, is the oldest and is universally used where more than one welder operates from the same machine. The constant-current system may properly be subdivided into two types; namely, the open circuit and the closed circuit. The open-circuit system which is well known in the art is limited to use with one arc on each machine; it has other draw-backs, which I will hereinafter mention. The closed circuit constant-current system was, apparently, first disclosed in my prior Patent No. 1,181,227, dated May 2, 1916, which system has opened great possibilities in the way of heat control which exist in no other system of which I have knowledge.

That the advantages to be derived from the proper control of the heat effects in the welding arc may be better understood, it is desirable at this time to consider the factors which enter into said control. It is known that the rate of total heat production in the arc is equal to the power in watts consumed between the terminals of the arc, but the temperature of the metal is not simply nor directly related to the watts consumed. In order to control the temperature of the metal, it is necessary then to take into account all of the factors that determine it. Therefore, it may be well to analyze briefly, the production of heat in an electric welding arc.

Beginning with the pencil point which ordinarily, but not necessarily, is connected to the negative side of the circuit, we find that the temperature produced here depends upon the power in watts consumed at this point; that is, upon the product of the current through the arc and the E. M. F. drop at the terminal of the arc. Experience has shown that the E. M. F. drop at each terminal of the arc is practically constant, and independent of the current; that is, the resistance at each terminal of the arc decreases when the current increases, and vice versa, which accounts for the instability of a metallic arc when connected to a source of constant-potential, and this is the reason why it must be connected in series with a relatively large resistance. Therefore, since the E. M. F. is constant, the temperature of the metal at the pencil point, in other words, the flow of the metal from the pencil point depends almost entirely upon the current alone.

Again, the temperature of the metal in the arc stream is determined by the power consumed in the stream, and by the rate of flow from the pencil.

The resistance of the arc stream seems to be approximately constant per unit of length, so that the E. M. F. consumed is directly proportional to the length of the arc. This is the reason that a carbon arc with a long stream can be operated from a constant-potential source without a series resistance. The resistance of the arc stream takes the place of an external resistance and stabilizes the arc sufficiently to prevent its being extinguished. The power consumed in the arc is the product of the current through the arc and the voltage drop in the stream; while the flow of metal is determined by the current; as above indicated. Since the resistance of the stream is directly proportional to its length, the length of the arc is fixed by the voltage impressed across it. Therefore, in order to control the temperature of the metal in the stream, we must control both the current and the E. M. F. and each independently of the other.

The temperature at the end of the arc where it impinges upon the work depends upon the rate of flow of the metal, the temperature of the metal that arrives, and upon the rate at which energy is produced in the terminal itself, as well as upon the heat dissipating capacity of the mass surrounding the point where the metal is deposited. I have heretofore considered the origin of the heat brought in by the molten metal itself, and I will here state that the heat produced at this terminal of the arc is exactly similar to that produced at the other terminal; that is, it depends upon the current through the arc. Therefore, it will be seen that the final temperature of the metal depends upon both the current and the E. M. F., and that the value of each must be controlled independently, if anything like accurate results are to be obtained while still retaining the flexibility of application.

With this general reference to the prior art and of the requirements thereof, I will state that an essential object of the present invention is to adjust and control the heat effect of the arc, by means of voltage limitation automatically varied by the operation of the arc itself, and that the invention may be fully understood, I will now refer to Fig. 1, wherein 1 and 3 are terminals connected in a circuit which carries a constant-current or a regulated current; by regulated current, I mean a current that is automatically regulated in such a way that a short circuit will not cause destructive rise in current. Normally, the terminals of the circuit are closed through a short circuiting contact, 2, which is designed to be held closed by the core of a solenoid coil, 4, to which the contact is connected, said coil being itself connected to a separate source, 14, of electric energy.

Connected to the terminals, 1 and 3, of the circuit I have a resistance, 10, in series with a contactor, 8, and the arc circuit, 6 and 7, in parallel therewith, 7 representing a solenoid coil, the coil of which is connected to said contactor, and which contactor is normally closed, but no current passes that way on account of the fact that the closure of the contact, 2, will reduce the voltage drop between the terminals, 1 and 3, to practically nothing. Provision is made for the short circuiting of the coil, 4, and this may be effected by inserting a shunt, 11, in parallel with the coil and controlling this shunt by a releasing switch, push button, or like circuit closer, 12, whereby upon pressing this button, or operating the equivalent switch, will short circuit the solenoid coil, 4, and release the contact, 2, under the pull of an appropriate spring, 16, to which the contact is connected. The current in the main circuit must now pass from the terminal, 1, through the resistor, 10, and contactor, 8, back to the terminal, 3, the current, through the resistor producing a drop in E. M. F. between the terminals 1 and 3. In this condition, if the terminals of the arc, 6, are brought together, the resistance through that circuit will be so much less than through the resistor, 10, and the contactor, 8, that a large proportion of the current will immediately pass through the arc, 6, and solenoid coil, 7, and in so doing, the coil, 7, is energized and opens the contactor, 8, leaving the arc, 6, as the only path through which the main circuit is maintained and therefore carrying all of the current. The energizing of the coil, 7, also opens a suitable contactor, 9, which is suitably connected to the core of said coil thereby inserting the shunt, 11, in parallel with the solenoid coil, 4, so that continued pressure of the push button, 12, or equivalent part, will maintain a reduced current through the coil, 4.

I retard the opening of the contactor, 9, by the employment of a suitable dash-pot, 23, so that for a short space of time the welder is given a higher voltage limit to assist him in starting, because until the contact, 9, is opened, the coil, 4 is entirely dead.

In a suitable shunt circuit which includes a rheostat, 15, I arrange a solenoid coil, 5, the arrangement of the parts being such that as the arc is lengthened and shortened in operation, more or less current is shunted through the coil, 5, which coil and the coil, 4, assist each other in pulling against the tension of the spring, 16, to which the cores of the coils are connected, and whenever the E. M. F. across the arc, 6, rises sufficiently, it will shunt enough current through the coil, 5, so that the combined pull of the coils, 4 and 5, will overcome the spring, 16, and close the contactor, 2, and thereby short circuit the arc, which prevents absolutely any further rise in E. M. F. and kills the arc without any possibility of temperature increase which will burn the metal.

The operation may be stopped at any time without any rise in heat by simply releasing the switch or push button, 12, and when this is done all of the current from the source, 14, is permitted to pass through the coil, 4 and this will result in the contactor, 2, being closed thereby killing the arc and the coil, 7. The contactor, 8, is then closed by an appropriate spring, 17, leaving the control circuit in exactly the same condition as when the operation commenced, that is, ready to begin welding.

From the foregoing it will readily be seen that the circuits shown are connections of a controller which may be used in a closed circuit-series system, such as described in my prior patent before alluded to; or it may be used for a single operator in any system.

The arrangement shown in Fig. 2, while somewhat different from that described for Fig. 1, accomplishes the same purpose, but in Fig. 2, the coil, 7, has been split into two parts, one of which, 21, has its core connected to a separate plunger, 21', which is employed to operate the contactor, 9', against the combined action of a spring, 22, and a dash-pot, 23'.

The operation of the system shown in Fig. 2 does not depart materially from that already described in Fig. 1, and will be readily understood by those skilled in this art.

In the arrangement shown in Fig. 3, there is a still different method of accomplishing the same result, and this is effected largely by means of an automatic adjustment applied to the coil, 5. In said Fig. 3, I employ a coil, 19, which is in series with the arc and exerts a pull upon the lever-arm of an appropriate rheostat, 15, in such a manner as to reduce the resistance in series with the coil, 5. The pull of the coil, 19, is opposed by a dash-pot, 18, and a suitable spring, 26, connected to the arm of the rheostat, so that the speed with which the resistance is changed, depends upon the adjustment of the dash-pot, 18.

The arrangement shown in Fig. 3 differs slightly in its results from that shown in Figs. 1 and 2 in that the E. M. F. limit instead of changing suddenly from a high initial value to a lower operating value, changes gradually. The range over which it changes, that is, the upper and lower limits are determined by the adjustment of suitable stops, 20, between which the inner end of the rheostat arm operates.

It is desirable to allow a greater voltage limit at the start on account of the cold metal, which requires extra heat in order to make a good weld, and this is best obtained by drawing a slightly longer arc, then after a short time the arc should be decreased in length and maintained at the same length until the operation is completed. In stopping it, the arc should be reduced or at least not allowed to rise so as to avoid any possibility of burning the metal.

From the foregoing description it will be understood that a leading purpose of the present improvement is to adjust and control the heat effect of the arc, by means of voltage limitation which is automatically varied by the operation of the arc itself.

Having thus described my invention what I claim as new and desire to secure by Letters Patent is:—

1. The method of arc welding consisting in starting the arc with a certain voltage limit and then decreasing this voltage limit during the welding operation.

2. The method of arc welding consisting in starting the arc with a certain voltage limit and then decreasing this voltage limit after a period of time has elapsed from the starting of the arc.

3. The method of arc welding consisting in starting an arc with a certain voltage limit and then automatically decreasing this voltage limit after a period of time has elapsed from the starting of the arc.

4. The method of arc welding consisting in starting an arc with a comparatively high voltage limit, lowering this voltage limit after a period of time has elapsed from the starting of the arc, and ending the operation by short circuiting the arc.

In testimony whereof I affix my signature.

OTIS ALLEN KENYON.